US012081306B2

(12) United States Patent
Dong et al.

(10) Patent No.: US 12,081,306 B2
(45) Date of Patent: Sep. 3, 2024

(54) BEAM FAILURE RECOVERY FOR SECONDARY CELL

(71) Applicant: ZTE Corporation, Guangdong (CN)

(72) Inventors: Fei Dong, Guangdong (CN); He Huang, Guangdong (CN); Xiaojuan Shi, Guangdong (CN); Bo Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/222,773

(22) Filed: Jul. 17, 2023

(65) Prior Publication Data
US 2024/0030999 A1 Jan. 25, 2024

Related U.S. Application Data

(63) Continuation of application No. 17/646,250, filed on Dec. 28, 2021, now Pat. No. 11,705,956, which is a
(Continued)

(51) Int. Cl.
*H04B 7/08* (2006.01)
*H04B 7/06* (2006.01)
(Continued)

(52) U.S. Cl.
CPC ........ *H04B 7/088* (2013.01); *H04W 72/1263* (2013.01); *H04W 76/19* (2018.02); *H04W 80/02* (2013.01)

(58) Field of Classification Search
CPC . H04B 7/088; H04B 7/0695; H04W 72/1263; H04W 76/19; H04W 80/02;
(Continued)

(56) References Cited

U.S. PATENT DOCUMENTS 11,627,627 B2 * 4/2023 Cirik .................... H04B 7/0695
 370/228
11,856,422 B2 12/2023 Liu et al.
(Continued)

FOREIGN PATENT DOCUMENTS

CN 108513737 A 9/2018
CN 108702767 A 10/2018
(Continued)

OTHER PUBLICATIONS

Korean office action issued in KR Patent Application No. 10-2022-7002768, dated Dec. 14, 2023, 8 pages. English translation included.
(Continued)

*Primary Examiner* — Harry H Kim
(74) *Attorney, Agent, or Firm* — Perkins Coie LLP

(57) ABSTRACT

Methods, apparatus, and systems for a beam failure recovery on one or more secondary cells are described. In one example aspect, a wireless communication method includes receiving, by a first device, parameters configured to carry out beam failure detection and beam failure recovery for secondary cells associated with the first device, determining, by the first device, whether a beam failure event has occurred on at least one of the secondary cells based on at least one of the parameters, performing, upon a determination that the beam failure event has occurred, a beam failure recovery procedure for the secondary cell with the beam failure event, and terminating the beam failure recovery procedure upon an occurrence of a termination event.

18 Claims, 7 Drawing Sheets

Related U.S. Application Data continuation of application No. PCT/CN2019/093811, filed on Jun. 28, 2019.

(51) Int. Cl.

| | |
|---|---|
| *H04W 36/30* | (2009.01) |
| *H04W 72/044* | (2023.01) |
| *H04W 72/1263* | (2023.01) |
| *H04W 72/21* | (2023.01) |
| *H04W 72/23* | (2023.01) |
| *H04W 74/08* | (2024.01) |
| *H04W 74/0816* | (2024.01) |
| *H04W 74/0833* | (2024.01) |
| *H04W 76/19* | (2018.01) |
| *H04W 80/02* | (2009.01) |

(58) Field of Classification Search

CPC ............ H04W 74/08; H04W 74/0816; H04W 36/305; H04W 72/046; H04W 72/23; H04W 74/0833; H04W 72/21

See application file for complete search history.

(56) References Cited

U.S. PATENT DOCUMENTS

| | | | | |
|---|---|---|---|---|
| 11,870,724 | B2* | 1/2024 | Zhou | H04B 7/088 |
| 11,895,672 | B2* | 2/2024 | Dinan | H04W 72/23 |
| 2016/0021694 | A1* | 1/2016 | Pan | H04W 4/70 |
| | | | | 370/329 |
| 2016/0128094 | A1 | 5/2016 | Lee et al. | |
| 2016/0366675 | A1 | 12/2016 | Dinan | |
| 2018/0227899 | A1 | 8/2018 | Yu et al. | |
| 2019/0182896 | A1 | 6/2019 | Shrestha et al. | |
| 2019/0215048 | A1 | 7/2019 | Cirik et al. | |
| 2019/0253986 | A1 | 8/2019 | Jeon et al. | |
| 2019/0306765 | A1* | 10/2019 | Cirik | H04W 36/0058 |
| 2020/0092785 | A1 | 3/2020 | Yang | |
| 2020/0145280 | A1 | 5/2020 | Cirik et al. | |
| 2020/0196327 | A1 | 6/2020 | Zhang et al. | |
| 2020/0305181 | A1 | 9/2020 | Yue et al. | |
| 2020/0328796 | A1* | 10/2020 | Turtinen | H04B 7/0695 |
| 2020/0350973 | A1* | 11/2020 | Cirik | H04W 74/0833 |
| 2021/0028853 | A1 | 1/2021 | Wu et al. | |
| 2021/0044344 | A1 | 2/2021 | Jiang | |
| 2021/0306061 | A1 | 9/2021 | Jiang | |
| 2022/0022219 | A1 | 1/2022 | Liu et al. | |

FOREIGN PATENT DOCUMENTS

| | | | |
|---|---|---|---|
| CN | 109076365 | A | 12/2018 |
| CN | 109076616 | A | 12/2018 |
| CN | 109246732 | A | 1/2019 |
| EP | 3606168 | A1 | 2/2020 |
| WO | 2018174257 | A1 | 9/2018 |
| WO | 2019096394 | A1 | 5/2019 |
| WO | 2022225296 | A1 | 10/2022 |

OTHER PUBLICATIONS

Interdigital Inc., "BFR on SCell," 3GPP TSG-RAN WG2, RAN2#102, R2-1806821, Busan, Republic of Korea, May 21-25, 2018, 2 pages.

NEC, "Discussion on multi-beam operation," 3GPP TSG RAN WG1 #97, R1-1906399, Reno, US, May 13-17, 2019, 3 pages.

Huawei et al., "BFR with SCell deactivation and MAC reset," 3GPP TSG-RAN WG2 Meeting 102, R2-1808418, Busan, Korea, May 21-25, 2018, 6 pages.

Samsung, "Enhancements on multi-beam operations," 3GPP TSG RAN WG1 97, R1-1906969, Reno, USA, May 13-17, 2019, 11 pages.

Intel Corporation, "On Beam Management Enhancement," 3GPP TSG RAN WG1 Meeting #97, R1-1906816, Reno, USA, May 13-17, 2019, 16 pages.

International Preliminary Report on Patentability issued in International Patent Application No. PCT/CN2019/093811, dated Dec. 28, 2021, 4 pages.

European Communication pursuant to Article 94(3) EPC issued in EP Patent Application No. 19934909.3, dated Jan. 2, 2024, 7 pages.

Huawei (Rapporteur), "E-mail discussion summary [104#39][NR/IIOT] Intra UE prioritization UL Control Data (Huawei)," 3GPP TSG-RAN WG2 #105, R2-1901439, Athens, Greece, Feb. 25-Mar. 1, 2019, 29 pages.

Ericsson, "Update to RACH counters and SR counter when LBT failure," 3GPP TSG-RAN2 Meeting #106, TDoc R2-1907605, Reno, USA, May 13-17, 2019, Change Request, 4 pages.

LG Electronics Inc, "Correction to SLSS resource configuration," 3GPP TSG-RAN2 Meeting #101-Bis, R2-1806029, Sanya, China, Apr. 16-20, 2018, Change Request, 4 pages.

U.S. Appl. No. 62/753,288, filed Oct. 31, 2018, 157 pages.
U.S. Appl. No. 62/754,125, filed Nov. 1, 2018, 155 pages.
U.S. Appl. No. 62/806,083, filed Feb. 15, 2019, 20 pages.

3GPP, TS 38.321, V15.4.0, (Dec. 2018); Technical Specification; 3rd Generation Partnership Project; Technical Specification Group Radio Access Network; NR; Medium Access Control (MAC) protocol specification; (Release 15); 77 pages.

Convida Wireless, "On Beam Failure Recovery for SCell," 3GPP TSG-RAN WG1 #97, Reno, U.S.A., R1-1907466, 7 pages, May 13-17, 2019.

International Search Report and Written Opinion mailed on Mar. 26, 2020 for International Application No. PCT/CN2019/093811, filed on Jun. 28, 2019 (6 pages).

Partial European Search Report for EP Patent Application No. 19934909.3, dated Jun. 9, 2022, 14 pages.

Anonymous: "3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre; 650, Route Des Lucioles; F-06921 Sophia-Antipolis Cedex; France, vol. RAN WG2, No. V1.2.0, Dec. 11, 2017 (Dec. 11, 2017), pp. 1-55, XP051391865, [retrieved on Dec. 11, 2017].

European Search Report for EP Patent Application No. 19934909.3, dated Sep. 9, 2022, 14 pages.

Canadian office action issued in CA Patent Application No. 3,145,398, dated Dec. 29, 2023, 5 pages.

Chinese office action issued in CN Patent Application No. 202210915362.8, dated May 17, 2024, 24 pages. English translation included.

European Communication pursuant to Article 94(3) EPC issued in EP Patent Application No. 19934909.3, dated Jun. 28, 2024, 7 pages.

* cited by examiner

BEAM FAILURE RECOVERY FOR SECONDARY CELL

CROSS-REFERENCE TO RELATED APPLICATIONS

This application is a continuation of U.S. patent application Ser. No. 17/646,250, filed on Dec. 28, 2021, which is a continuation of International Patent Application No. PCT/CN2019/093811, filed on Jun. 28, 2019, the contents of each of which are incorporated herein by reference in their entireties.

TECHNICAL FIELD

This document is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

SUMMARY

This document provides techniques for a beam failure recovery (BFR) procedure performed for a secondary cell, including a sequence of messages exchanged with a user equipment (UE).

In one exemplary aspect, a wireless communication method is disclosed. The wireless communication method includes receiving, by a first device, parameters configured to carry out beam failure detection and beam failure recovery for secondary cells associated with the first device, determining, by the first device, whether a beam failure event has occurred on at least one of the secondary cells based on at least one of the parameters, performing, upon a determination that the beam failure event has occurred, a beam failure recovery procedure for the secondary cell with the beam failure event, and terminating the beam failure recovery procedure upon an occurrence of a termination event.

In another exemplary aspect, a wireless communication method is disclosed. The wireless communication method includes monitoring, by a user equipment, a downlink channel between a base station and the user equipment, determining, by the user equipment, whether a beam failure event has occurred on a secondary cell based on at least one of parameters of a radio resource control configuration for a beam failure recovery and a beam failure detection associated with the secondary cell, and performing, upon a determination that the beam failure event has occurred, a beam failure recovery procedure on the secondary cell.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The 5G New Radio (NR) utilizes a higher frequency domain (from 3.5 Ghz to 60 Ghz) than the current frequency domain in LTE. There are some advantages of using a high frequency domain in extending frequency resources, but the higher the frequency domain, the higher the pathloss during the radio propagation. Therefore, it is important to apply a beam forming technology that can reduce the pathloss of radio propagation in higher frequency domain.

Figure 1:
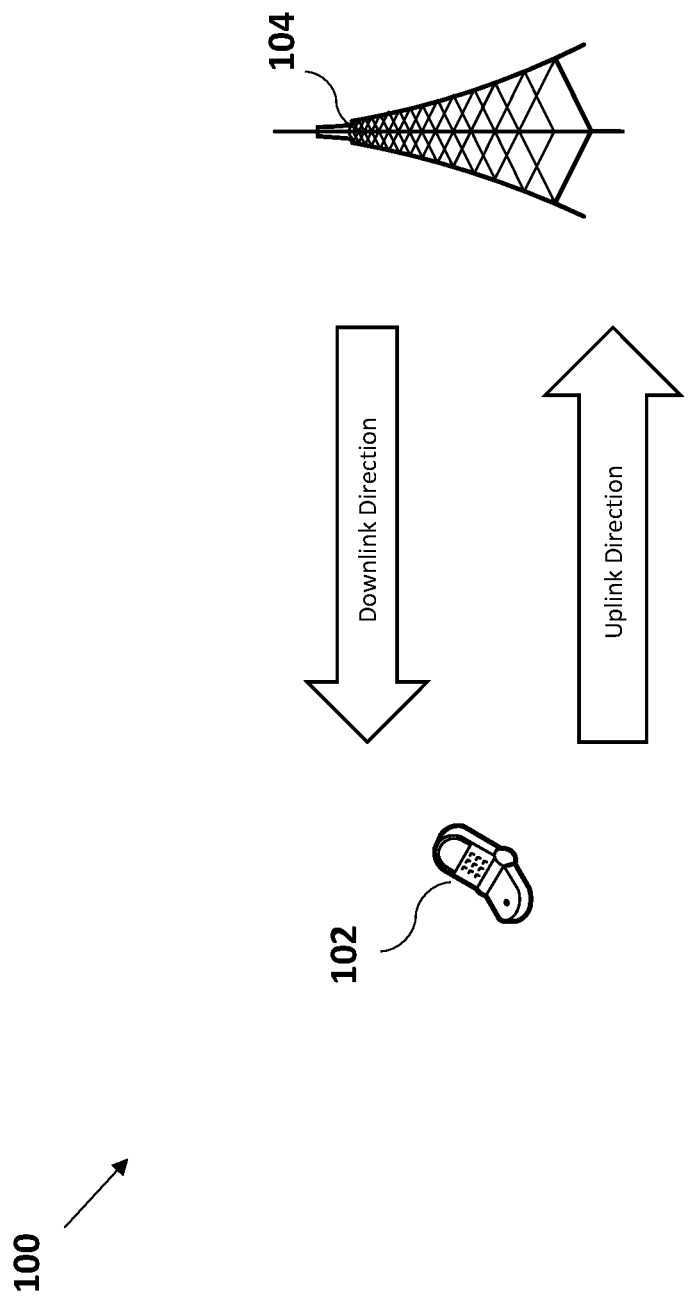
FIG. 1 shows an example of a user equipment communicating a base station via a downlink channel and an uplink channel.

FIG. 1 shows an example of a user equipment communicating a base station via a downlink channel and an uplink channel. In order to guarantee a successful reception of a downlink (DL) transmission such as a physical downlink control channel (PDCCH) transmission and a physical downlink shared channel (PDSCH) transmission, a network 100 performs a beam training procedure in an initial access for each user equipment (UE) 102. After initial access, a DL beam or a radio propagation path may be changed when the UE is moving, and the beam failure recovery procedure is needed for UE to notify a base station 104 (e.g., gNB) of those changes.

The base station 104, however, may not realize the current DL beam is not suitable. This will degrade the DL transmission performance, thus causing a considerable delay if the current serving cell is responsible for an ultra-reliable low latency communication (URLLC) service. Moreover, the UE 102 uses the failed DL beam to monitor the PDCCH continuously, which may cause the loss of downlink control information (DCI), and this can degrade the power efficiency for the UE 102.

Beam Failure Recovery for Secondary Cell

Various embodiments of the disclosed technology can improve the reliability and performance of the communication between the UE 102 and the base station 104 by implementing a beam failure recovery (BFR) procedure for a secondary cell (SCell).

Figure 2:
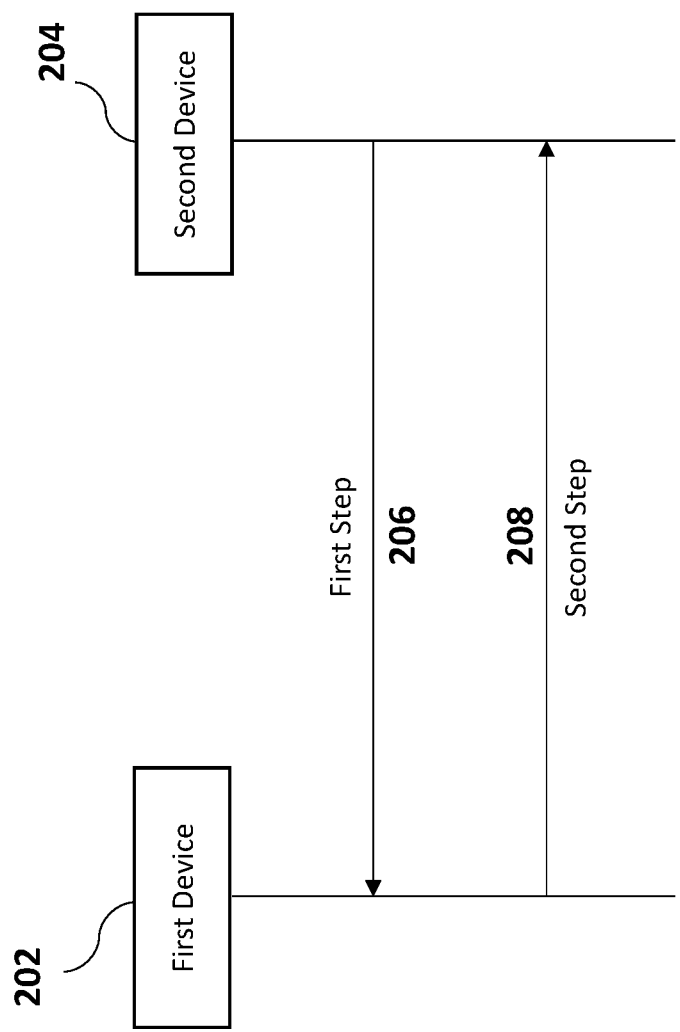
FIG. 2 shows an example of a beam failure recovery (BFR) for a secondary cell (SCell).

FIG. 2 shows an example of a beam failure recovery (BFR) for a secondary cell (SCell). Once a beam failure is detected by a first device (e.g., UE) 202, the first device 202 notifies a second device (e.g., base station; gNB) 204 of the occurrence of the beam failure to change the DL beam in order to guarantee the current DL data/signal reception.

The beam failure recovery (BFR) for the secondary cell (SCell) may include a first step 206 and a second step 208. At the first step 206, the first device 202 receives the beam failure detection and/or beam failure recovery configurations for the secondary cell (SCell) from the network. For example, the first device 202 receives, at the first step 206, a radio resource control (RRC) configuration for beam failure detection/beam failure recovery.

Once the beam failure is detected on a certain secondary cell (SCell), based on the configuration received, the first device (e.g., UE) triggers the beam failure recovery procedure for the secondary cell.

As an example, during the first step 206, the network may configure parameters associated with beam failure detection and beam failure recovery and send the parameters to the first device 202, which may be conducted via the RRC configuration. During the second step 208, the beam failure recovery can be implemented to generate, by the first device 202, one or more signals to notify the second device 204 (e.g., gNB) of the occurrence of the beam failure and the selected DL beam.

In an implementation, once the beam failure recovery (BFR) procedure is triggered, the first device (e.g., UE) initiates a random access (RACH) procedure on the certain secondary cell (SCell), in which beam failure is detected, through the corresponding RACH configuration based on the first step 206. The RACH procedure can be either a 2-step RACH procedure or a 4-step RACH procedure. As an example, the random access type for the BFR can be notified to UE at the first step 206.

The parameters for the beam failure detection may include a beam failure instance maximum count and a beam failure detection timer. The parameters for the beam failure recovery may include a scheduling request (SR) resource (e.g. SchedulingRequestId), BFR CORESET and/or search space, a RACH resource (e.g. 2-step RACH resource for BFR), and a beam recovered timer, beam failure response window or beam failure response timer.

The parameters may be configured on a cell group basis, or a secondary cell (SCell) basis, or on a control channel group (e.g., PUCCH group) basis, or on a timing advanced group (e.g., TA group) basis, or on a frequency range (FR) basis. The parameters may be configured on a cell type basis. In this case, different parameters can be configured for SPcell and SCell. In some implementations, different parameters that are configured in different ways can be combined. For example, part of the parameters can be configured on a cell group basis and part of the parameters can be configured on a SCell basis.

The beam failure recovery procedure includes triggering the beam failure recovery request MAC control element (BFRQ MAC CE). Here, the contents of this MAC control element have to include the selected DL beam, and corresponding serving cell. In an implementation, the MAC CE includes at least one of a synchronization signal and physical broadcast channel (PBCH) block (SSB) identifier, a channel-state information reference signal (CSI-RS) identifier, or a cell Identifier.

In some implementations, the parameters can be explicitly configured for each SCell/PUCCH group/TA group/FR. In some implementations, one or more parameters may have an independent configuration with a configuration ID, and the configuration ID may be linked to the SCell/PUCCH group/TA group/FR. In some implementations, each of the parameters may have a default configuration, which can be either specified in the specification for the network or configured through RRC signaling. In the absence of such a configuration for each SCell, PUCCH group, TA group and/or FR, default parameters may be used. In some implementations, each of the parameters may have a cell group level configuration. In the absence of such a configuration for each SCell, PUCCH group, TA group and/or FR, the cell group level configuration and/or parameters may be used.

Example procedures for the second step 208 are as follows.

In some embodiments of the disclosed technology, the beam failure recovery request MAC control element (BFRQ MAC CE) may be triggered by the beam failure recovery. In a scenario where there is no available UL-SCH resources for the BFRQ MAC CE transmission, the first device 202 may take different steps. As an example, once the BFRQ MAC CE is triggered and/or generated where no suitable UL grant can be used to carry the BFR MAC CE, if corresponding SR resource is configured in the first step 202, the first device 202 (e.g., UE) initiates the scheduling request (SR) transmission through the configured SR resource. As another example, once the BFRQ MAC CE is triggered or generated where no available UL grant can be used at this stage and no corresponding SR resource is configured to the first device 202 (e.g., UE) in the first step 206, the first device 202 (e.g., UE) triggers RACH procedure.

In some embodiments of the disclosed technology, the scheduling request (SR) for the beam failure recovery (BFR) is canceled upon occurrence of at least one of the following events: (1) transmission of a medium access control (MAC) protocol data unit (PDU) which includes one or more corresponding BFRQ MAC CEs that are triggered prior to the assembling of the MAC PDU; (2) the current failure beam for the present serving cell is recovered; (3) the BFR procedure is finished; (4) the SCell is deactivated or removed; (5) the SCell is reconfigured by RRC; (6) the radio link failure is triggered; (7) the secondary cell group (SCG) failure is triggered, in case the concerned secondary cell (SCell) is located in the SCG; (8) the master cell group (MCG) failure is triggered, in case the concerned secondary cell (SCell) is located in the MCG.

In some embodiments of the disclosed technology, the pending BFRQ MAC CE is canceled upon occurrence of at least one of the following events: (1) the transmission of the MAC PDU which includes one or more corresponding BFRQ MAC CEs that are triggered prior to the assembling of the MAC PDU; (2) the current beam failure for the serving cell is recovered; (3) the BFR procedure is finished; (4) the SCell is deactivated or removed; (5) the SCell is reconfigured by RRC; (6) the radio link failure is triggered; (7) the SCG failure is triggered, in case the concerned SCell is located in SCG; (8) the MCG failure is triggered, in case the concerned SCell is located in MCG.

In some embodiments of the disclosed technology, in cases where the scheduling request (SR) for the beam failure recovery (BFR) is canceled or the pending BFRQ MAC CE is canceled, whether the beam associated with the beam failure has been recovered can be determined as follows. In some implementations, whether the beam failure recovery procedure for the corresponding secondary cell (SCell) can be considered completed based on the following criteria: (1) expiration of beam recovered timer; (2) reception of beam recovered indication; (3) successful reception of a PDCCH transmission addressed to C_RNTI or BFR specific RNTI on the corresponding CORESET or search space, which is configured in the first step 206, on the serving cell, where the beam failure is detected; and (4) successful reception of a PDCCH transmission addressed to C_RNTI or BFR specific RNTI on the serving cell, where the beam failure is detected.

Once the beam failure recovery (BFR) procedure is detected, MAC need to cancel the triggered BFR procedure and BFRQ MAC CE and/or associated pending SR, Moreover, BFI_COUNTER is reset.

In terms of expiration of beam recovered timer, the UE behavior associated with the beam recovered timer is defined as follows: If the beam failure is detected or the BFRQ MAC CE is triggered, the beam recovered timer is started. During the running of the beam recovered timer, once the beam failure indication is received from a lower layer, the beam recovered timer is started/restarted. If the beam recovered timer is expired, the first device (e.g., UE) can assume that the failure beam is recovered.

In some embodiments of the disclosed technology, the Uplink MAC CE during the logical channel prioritization (LCP) procedure may have different priorities. Once the UL grant for new transmission is received, the LCP procedure is used for composing the MAC CE and MAC SDU together into one MAC PDU. Since sensitive procedures may be delayed due to the BFR procedure, the BFRQ MAC CE in the LCP procedure needs to have a higher priority than buffer status report (BSR) MAC CE with the exception of the BSR for padding and have a lower priority than the C-Radio Network Temporary Identifier (RNTI) MAC CE or data from uplink common control channel (UL-CCCH).

Figure 3:
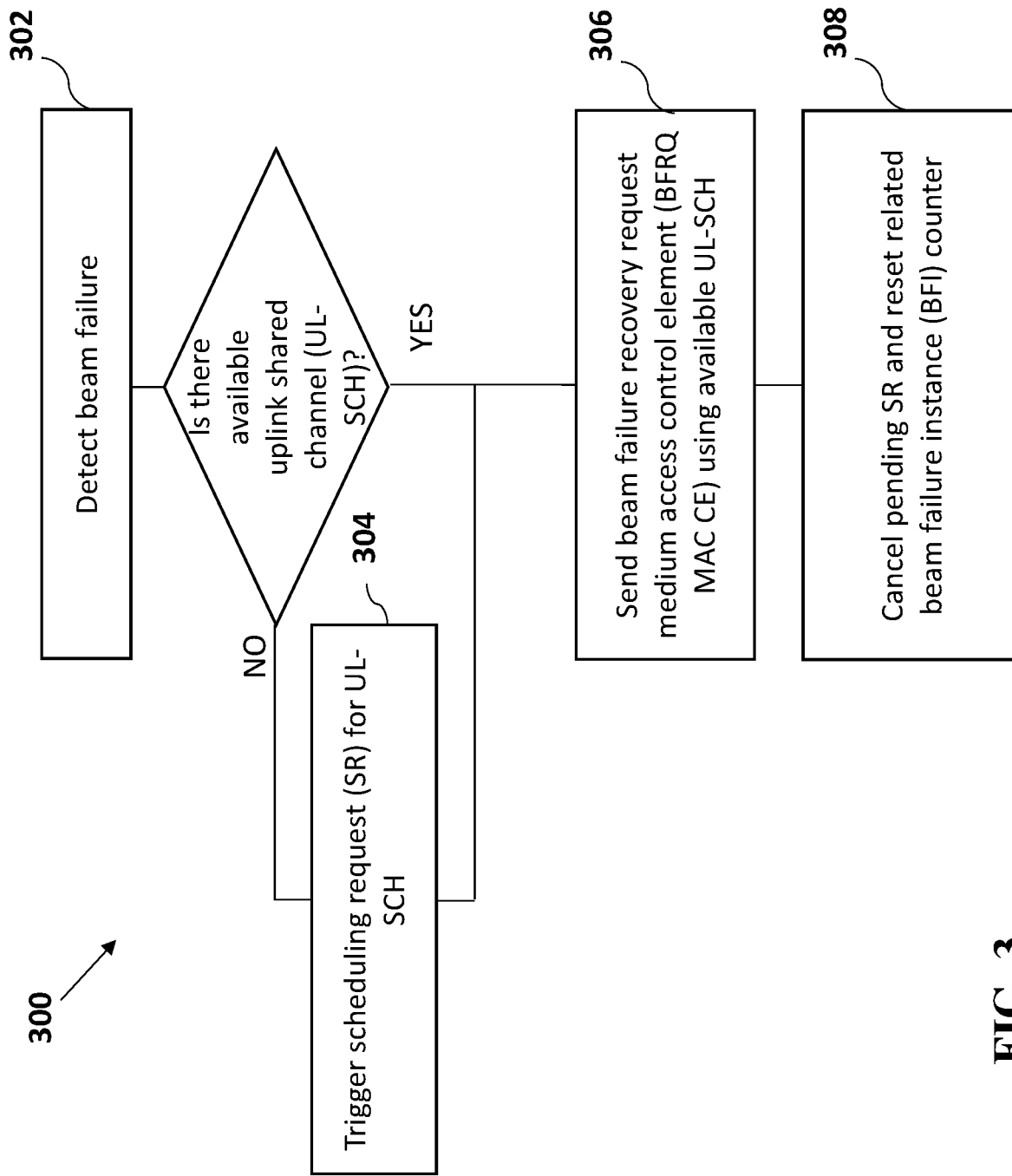
FIG. 3 shows an example transmission of a beam failure recovery request medium access control element (BFRQ MAC CE).

FIG. 3 shows an example transmission of a beam failure recovery request medium access control element (BFRQ MAC CE). The first device (e.g., UE) can carry out at least one of the following tasks if the BFRQ MAC CE is transmitted.

In an implementation, the first device (e.g., UE) may cancel the related pending SR, if any, and consider the BFR procedure as terminated.

In another implementation, the first device may try to receive ACK and/or NACK from the base station (e.g., gNB). In an implementation, ACK can indicate an acknowledgement of reception of BFRQ MAC CE, and NACK can indicate non-reception of BFRQ MAC CE. In another implementation, the ACK/NACK may indicate the result of the beam recovery. If the SR is triggered and pending, and if the MAC PDU transmitted includes the BFRQ MAC CE triggered prior to the assembling of this MAC PDU, the SR is canceled. Furthermore, if this SR is triggered by not only BFRQ MAC CE but also BSR MAC CE, it means that this pending status will be remaining until both the BFRQ MAC CE and the BFR MAC CE associated with this SR are transmitted. If the ACK is received, the first device (e.g., UE) may consider the BFR procedure as terminated, and a beam failure recovery counter (BFI_COUNTER) is reset to zero. If the NACK is received or there is no ACK is received by the first device (e.g., UE), the first device may consider the BFR procedure as unsuccessful.

As shown in FIG. 3, once a beam failure is detected (302), the beam failure recovery procedure 300 can vary depending on whether there is an available uplink shared channel (UL-SCH). In case there is an available UL-SCH for the BFRQ MAC CE transmission, the BFRQ MAC CE is sent (306) without sending a scheduling request (SR). In case there is no available UL-SCH for the BFRQ MAC CE transmission, the first device triggers the SR for scheduling UL-SCH (304), and once an uplink channel becomes available, the BFRQ MAC CE is sent (306).

Figure 4:
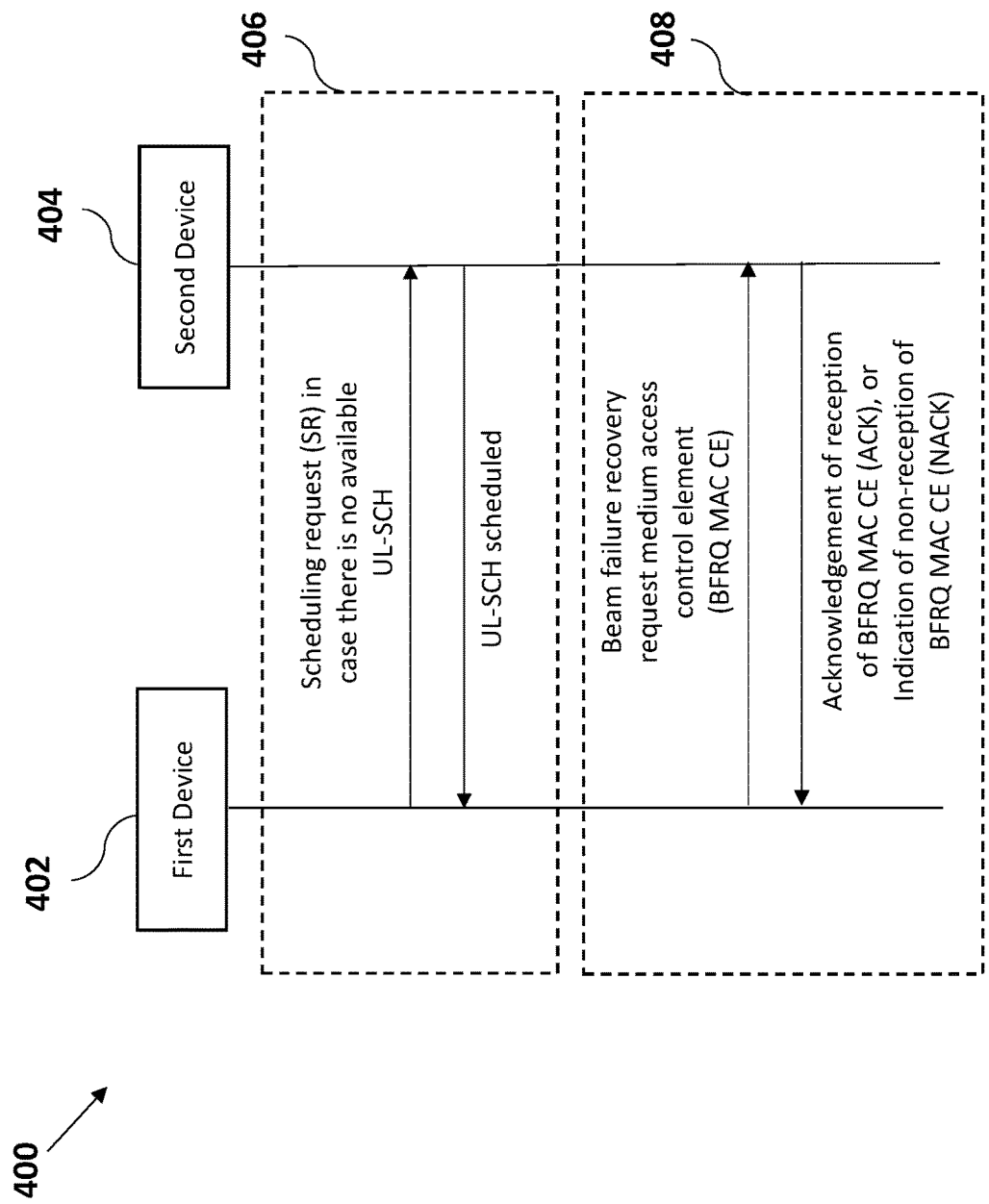
FIG. 4 shows an example transmission of acknowledgement of reception of BFRQ MAC CE or indication of non-reception of BFRQ MAC CE.

FIG. 4 shows an example transmission of acknowledgement of reception of BFRQ MAC CE or indication of non-reception of BFRQ MAC CE.

If the beam failure is detected by the first device (e.g., UE), the first device 402 starts the beam failure recovery procedure 400, and the BFRQ MAC CE is triggered. If there is no available UL-SCH resources for sending the BFRQ MAC CE, then the first device 402 (e.g., UE) sends SR like PUCCH to the second device 404 (e.g., base station, gNB) requesting a new UL transmission (406). If there is available UL-SCH resources for sending the BFRQ MAC CE, then the first device 402 (e.g., UE) sends, without sending the SR like PUCCH to the second device 404, a BFRQ MAC CE for acquiring the DL beam recovery (408).

Subsequently, the second device (e.g., gNB) sends an implicit/explicit ACK/NACK to notify UE whether it is successful. In this step, the first device (e.g., UE) may wait until the ACK/NACK is sent to the BFRQ MAC CE from the second device (e.g., gNB) when the BFRQ MAC CE is transmitted. Thus, once the BFRQ MAC CE is sent to the second device (e.g., gNB), one timer is needed for the first device (e.g., UE) to receive the ACK/NACK in a certain period.

In receiving the ACK/NACK to BFRQ MAC CE, the reception of ACK/NACK can be terminated in certain situations to prevent infinite iterations. In some implementations, one timer (e.g., bfr_ResponseTimer) or time windows (e.g., bfr_ResponseWinow) may be used for the first device (e.g., UE) to determine the endless reception of ACK/NACK or beam failure recovery procedure or to determine that the first device (e.g., UE) cannot receive any response from the second device (e.g., gNB)

The timer or timer windows is started or restarted upon occurrence of at least one of the following events: (1) the beam failure recovery is triggered; (2) the BFRQ MAC CE is sent to the base station (gNB); (3) the MAC PDU with BFRQ MAC CE is composed for an available PUSCH transmission.

The timer or timer windows is stopped upon occurrence of at least one of the following events: (1) the beam failure recovery procedure is finished; (2) the ACK/NACK is received; (3) the current failure beam for this serving cell is recovered; (4) the BFR procedure is finished; (5) the SCell is deactivated or removed; (6) the SCell is reconfigured by RRC; (7) the radio link failure is triggered; (8) the SCG failure is triggered, in case the concerned SCell is located in SCG; (9) the MCG failure is triggered, in case the concerned SCell is located in MCG.

If the timer/time window is expired without any reception of ACK from the second device (e.g., base station, gNB) or if only NACK is received from the second device (e.g., gNB), the first device (e.g., UE) can carry out the following tasks.

Once the first device (e.g., UE) finds that there is no ACK/NACK or only NACK was received to the BFRQ MAC CE until the expiration of the timer (e.g., bfr_ResponseTimer) or time windows (e.g., bfr_ResponseWinow), the first device (e.g., UE) assumes that this attempt for beam failure recovery is failed. Therefore, UE shall perform at least one of the following tasks: (1) the first device (e.g., UE) assumes that the BFR procedure has been failed, and deactivates the failed SCell to save power, and generates one MAC CE to notify gNB of the renewed SCells situation; (2) the first device (e.g., UE) assumes that the BFR procedure has been failed and resets the BFI_COUNTER; (3) the first device (e.g., UE) assumes this round of BFR procedure has been failed, and then triggers another BFRQ MAC CE or triggers another round of beam failure recovery procedure.

For task (1), examples of the SCell deactivation MAC CE are as follows. The MAC CE includes at least one of a serving cell identifier or a status indication. The MAC CE is one bitmap MAC CE, each bit in this MAC CE is mapped to each serving cell, and "0" can indicate this serving cell is in a deactivation status, and "1" can indicate the mapped serving cell is in an activation status.

For task (3), the first device (e.g., UE) can carry out the following tasks upon a determination that this round of BFR procedure has failed. In this case, a BFR_COUNTER is needed for the first device (e.g., UE) to calculate the number of iterations of BFR attempts. The first device (e.g., UE) received the maximum number set to the counter by RRC configuration to limit the maximum number of iterations of BFR attempts. The first device (e.g., UE) can carry out the following tasks: (1) at step 1, the BFRQ MAC CE is triggered, and there is available UL-SCH resources currently for this MAC CE; (2) at step 2, the first device (e.g., UE) composes the MAC PDU that includes the BFRQ MAC CE, and sends it to the second device (e.g. gNB), the BFR_ResponseTimer is started/restarted; (3) at step 3a, if the NACK is received during the running period of the BFR_ResponseTimer or if there is no ACK/NACK received until the expiration of BFR_Response Timer, the first device (e.g., UE) considers this round of the BFR attempts as failed, and increases the BFR_COUNTER by one, and then proceeds to step 4; (4) at step 3b, if one ACK is received during the running period of the BFR_ResponseTimer, the first device (e.g., UE) assumes this attempt of BFR as successful, and resets the BFI_COUNTER; at step 4, if the BFR_COUNTER has not reached the bfrMaximumCounter, the first device (e.g., UE) triggers another BFRQ MAC CE. Otherwise, the first device (e.g., UE) assumes the BFR on this serving cell is failed.

In some implementations, the BFR_COUNTER is reset upon occurrence of at least one of the following events: (1) the current failure beam for this serving cell is recovered; (2) the BFR procedure is finished successfully; (3) the SCell is deactivated or removed; (4) the SCell is reconfigured by RRC; (5) the radio link failure is triggered; (6) the SCG failure is triggered, in case the concerned SCell is located in SCG; (7) the MCG failure is triggered, in case the concerned SCell is located in MCG; (8) the beam failure recovery procedure is triggered; (9) the BFI_COUNTER reaches to the beam failure instance maximum count.

In some implementations, the ACK/NACK to the BFRQ MAC CE is as follows. One ACK/NACK needs be used for UE to determine whether the BFR on SCell is successful or not. Examples of the ACK/NACK can include: (1) BFR-RNTI; (2) PDCCH or DCI in the CORESET or search space for recovery; (3) DCI codepoint associated with the link recovery request message; (4) New or Reuse MAC command confirming the link recovery request message; (5) an indication for new data (in the received HARQ information) for a PUSCH carrying MAC-CE command (further condition: under the same HARQ process number); (6) receiving reconfiguration or activation of a TCI state associated with PDCCH.

For the BFR-RNTI, the first device (e.g., UE) is configured with BFR-RNTI, if the first device (e.g., UE) sends the BFRQ MAC CE, the first device (e.g., UE) may try to use the BFR-RNTI to receive the PDCCH, once the first device (e.g., UE) receive the BFR-RNTI addressed PDCCH, the first device (e.g., UE) assumes the BFRQ MAC CE is successfully received by the second device (e.g., gNB).

For the CORESET/SEARCH SPACE, the first device (e.g., UE) is configured with one search space or/and CORESET on the SCell for which the BFR is triggered. It is assumed that the BFR on SCell is successful if the first device (e.g., UE) receives the PDCCH in the preconfigured PDCCH resources set with a certain transmission configuration indication. In an implementation, it is assumed that the BFR on SCell is successful if the first device (e.g., UE) receives the PDCCH in the configured search space or CORESET with the Transmission Configuration Indication (TCI) state Quasi Co-Location (QCL) to the selected SSB (Primary Sync Signal, and Secondary Sync Signal/PBCH block) or channel state information reference signal (CSI-RS).

For the MAC CE based ACK/NACK signaling, the network may transmit the MAC CE or only MAC CE subheader to notify UE that the BFRQ MAC CE is received successfully. This confirms that MAC CE or only confirm MAC CE subheader can be newly designed or reusing of the currently existed MAC CE. For the newly designed MAC CE, at least one of the following parameter can be included: (1) Serving cell Identifier; (2) SSB identifier; (3) CSI-RS identifier. For the newly designed MAC CE subheader, a new Logical Channel Identifier (LCID) is allocated. In some implementations, in order to reuse the current MAC CE, the SCell activation/deactivation MAC CE can be reused as an ACK/NACK.

In receiving the reconfiguration or activation of a TCI associated with PDCCH, once the first device (e.g., UE) receives the TCI state indication for UE-specific PDCCH MAC CE or the RRC reconfiguration for TCI state of PDCCH, it means NW confirms the reception of BFRQ MAC CE.

User equipment behavior associated with beam failure recovery/beam failure detection when secondary cell is activated or deactivated If the SCell is deactivated, at least one of the following behavior shall be adapted: (1) cancel the pending SR, which is triggered by BFRQ MAC CE; (2) reset BFI_COUNTER; (3) stop a beam failure detection timer; (4) cancel the pending BFRQ MAC CE, if triggered by beam failure detection; (5) reset or stop the BFR_Response Timer/Window, if configured; (6) reset the BFR_COUNTER, if configured.

If the SCell is activated, at least one of the following behavior shall be adapted: (1) reset the BFI_COUNTER; (2) reset the BFR_COUNTER, if configured.

Figure 5:
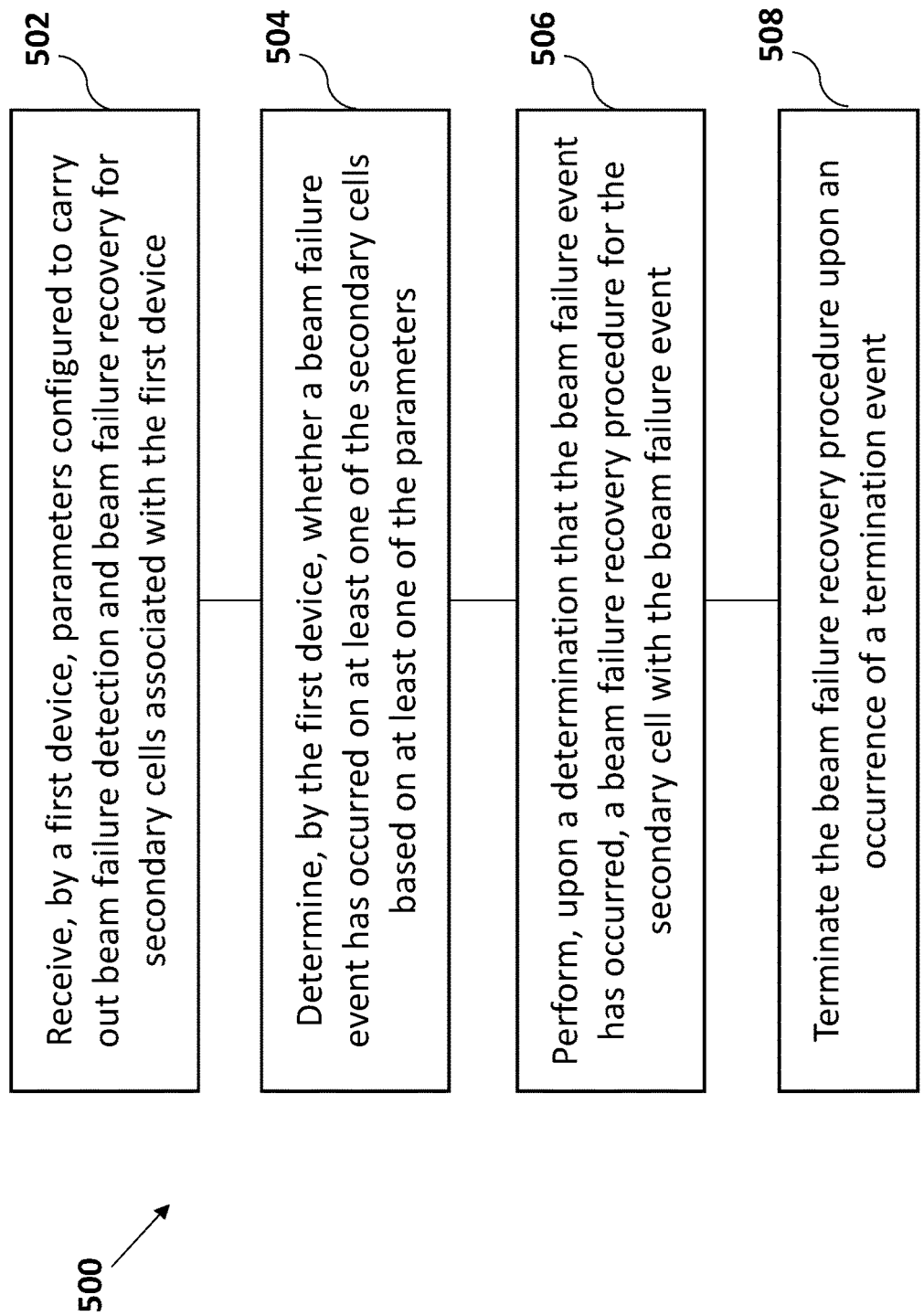
FIG. 5 is a flow diagram illustrating an example of a wireless communication method based on some embodiments of the disclosed technology.

FIG. 5 is a flow diagram illustrating an example of a wireless communication method based on some embodiments of the disclosed technology. The method may include, at step 502, receiving, by a first device, parameters configured to carry out beam failure detection and beam failure recovery for secondary cells associated with the first device, at step 504, determining, by the first device, whether a beam failure event has occurred on at least one of the secondary cells based on at least one of the parameters, at step 506, performing, upon a determination that the beam failure event has occurred, a beam failure recovery procedure for the secondary cell with the beam failure event, and at step 508, terminating the beam failure recovery procedure upon an occurrence of a termination event.

In an implementation, the parameters are configured on a cell group basis, or a secondary cell basis, or on a control channel group basis, or on a timing advanced group basis, or on a frequency range basis. In another implementation, the parameters are configured via at least one of a radio resource control (RRC) configuration or a medium access control (MAC) control element. In another implementation, the beam failure recovery procedure includes triggering a beam failure recovery request MAC control element. Here, the MAC control element includes at least one of a group of synchronization signals and physical broadcast channel (PBCH) block (SSB) identifier, a channel-state information reference signal (CSI-RS) identifier, or a cell Identifier. Furthermore, the beam failure recovery procedure may include initiating a scheduling request in case no uplink shared channel is available for sending the beam failure recovery request MAC control element.

The scheduling request is canceled in case: a transmission of a medium access control protocol data unit including a corresponding one or more the beam failure recovery request medium access control elements triggered prior to an assembling of the medium access control protocol data unit; the failure beam for this secondary cell is recovered; the beam failure recovery procedure is finished; the secondary cell is deactivated or removed; the secondary cell is reconfigured via the radio resource control signaling; a radio link failure is triggered; a secondary cell group failure that includes the secondary cell is triggered; or a master cell group failure that includes the secondary cell is triggered.

The triggering of beam failure recovery request MAC control element is canceled in case: a transmission of a medium access control protocol data unit including a corresponding one or more the beam failure recovery request medium access control elements triggered prior to an assembling of the medium access control protocol data unit; the secondary cell is recovered; the beam failure recovery procedure is finished; the failure beam for this secondary cell is deactivated or removed; the secondary cell is reconfigured by the radio resource control; a radio link failure is triggered; a secondary cell group failure that includes the secondary cell is triggered; or a master cell group failure that includes the secondary cell is triggered.

In an implementation, the beam failure recovery procedure includes performing a random access procedure for beam failure recovery. In another implementation, the beam failure recovery procedure includes sending, by the first device, a beam failure recovery request MAC control element to a second device. Here, the beam failure recovery procedure further includes determining, by the first device, the beam failure recovery procedure is terminated. As an example, the beam failure recovery procedure further includes resetting, by the first device, the beam failure indication counter. The beam failure recovery procedure may further include canceling, by the first device, a pending scheduling request.

In an implementation, the beam failure recovery procedure includes receiving, by the first device, a notification to the beam failure recovery request MAC control element from the second device. Here, the beam failure recovery procedure further includes determining, by the first device, whether the beam failure recovery procedure is successful upon the notification. Furthermore, the notification to the beam failure request MAC control element may indicate at least one of: a beam failure recovery radio network temporary identifier; a physical downlink control channel or downlink control information in a control resource set (CORESET) or in a search space; downlink control information codepoint associated with a link recovery request message; or an indication that a physical uplink shared channel is carrying a medium access control element command. The beam failure recovery procedure may further include configuring, by first device, a beam failure response timer or a beam failure response window for monitoring the notification to the beam failure request MAC control element from the second device.

The beam failure recovery timer is started or restarted upon occurrence of predetermined events, including: the beam failure recovery is initiated; the beam failure recovery request medium access control element is sent to the base station; and a medium access control protocol data unit with the beam failure recovery request medium access control element is formed for a physical uplink shared channel. Here, at least one of the beam failure response timer or the beam failure response windows is stopped upon occurrence of predetermined events, including: the beam failure recovery procedure is finished; an acknowledgement that the second device has received the beam failure recovery request or a notification that the second has not received the beam failure recovery request; the failure beam for the secondary serving cell is recovered; the beam failure recovery procedure is finished; the secondary cell is deactivated or removed; the secondary cell is reconfigured by a radio resource control (RRC); a radio link failure is triggered; a secondary cell group (SCG) failure is triggered where the SCG includes the secondary cell; and a master cell group (MCG) failure is triggered where the MCG includes the secondary cell.

The beam failure recovery procedure further includes determining, by the first device, the beam failure recovery procedure is not successful in case that: the notification is not received until the expiration of beam failure response timer; or the notification indicated that the beam recovery is not successful. The first device includes a beam failure recovery counter configured to count a number of beam failure recovery request attempt iterations. The beam failure recovery counter is configured to increase by one at every beam failure recovery request transmission. The beam failure recovery procedure further includes triggering, by the first device, another beam failure recovery request in case the beam failure recovery counter has not reached the threshold value. The beam failure recovery counter is reset upon occurrence of one or more predetermined reset events, including: the secondary cell with the beam failure event is recovered; the beam failure recovery procedure is finished successfully; the secondary cell with the beam failure event is deactivated or removed; the secondary cell with the beam failure event is reconfigured; a radio link failure is triggered; and the count reaches to a predetermined maximum count.

In an implementation, the termination event includes at least one of: a transmission of a beam failure recovery request MAC control element; a beam failure recovery counter reaching a maximum value; an expiration of beam failure recovery timer; and a notification reception from the second device. In another implementation, the beam failure recovery procedure includes resetting, by the first device, a beam failure indication counter upon termination of a beam failure recovery. In another implementation, the beam failure recovery procedure includes canceling, by the first device, a pending scheduling request that is associated with the beam failure recovery request, upon termination of a beam failure recovery.

Figure 6:
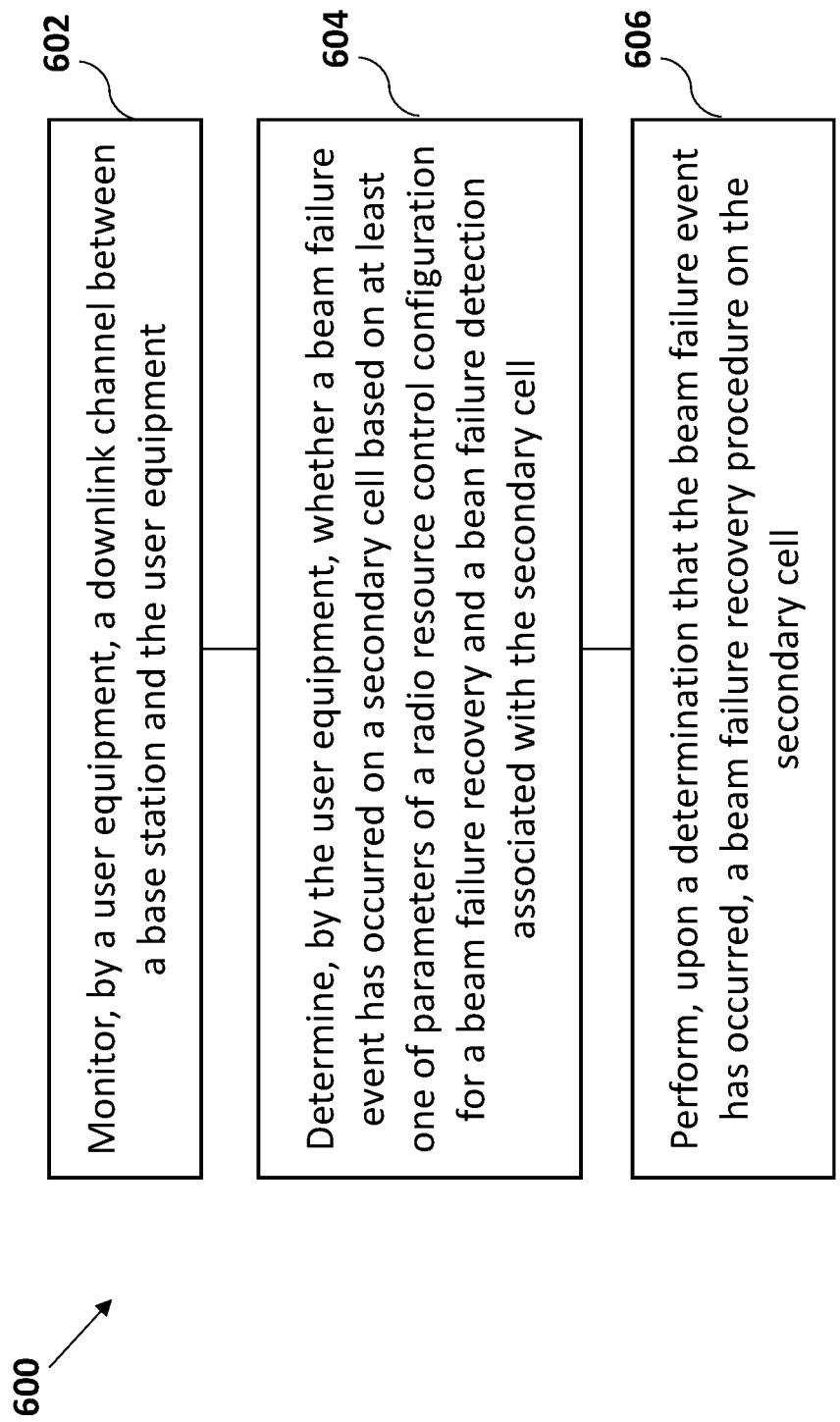
FIG. 6 is a flow diagram illustrating another example of a wireless communication method based on some embodiments of the disclosed technology.

FIG. 6 is a flow diagram illustrating another example of a wireless communication method based on some embodiments of the disclosed technology. The method may include, at step 602, monitoring, by a user equipment, a downlink channel between a base station and the user equipment, at step 604, determining, by the user equipment, whether a beam failure event has occurred on a secondary cell based on at least one of parameters of a radio resource control configuration for a beam failure recovery and a beam failure detection associated with the secondary cell, and at step 606, performing, upon a determination that the beam failure event has occurred, a beam failure recovery procedure on the secondary cell.

In some implementations, the monitoring the downlink channel between the wireless network and the user equipment includes receiving a radio resource control configuration for a beam failure recovery. In some implementations, the parameters are configured on a cell group basis, or a secondary cell basis, or on a control channel group basis, or on a timing advanced group basis, or on a frequency range basis. In some implementations, the parameters are configured via at least one of a radio resource control (RRC) configuration or a medium access control (MAC) control element. In some implementations, the beam failure recovery procedure includes triggering a beam failure recovery request MAC control element.

The MAC control element may include at least one of a synchronization signal and physical broadcast channel (PBCH) block identifier, a channel-state information reference signal (CSI-RS) identifier, and a cell Identifier. The beam failure recovery request medium access control element is canceled in case: a transmission of a medium access control protocol data unit including a corresponding one or more the beam failure recovery request medium access control elements triggered prior to an assembling of the medium access control protocol data unit; the failure beam for the secondary cell is recovered; the beam failure recovery procedure is finished; the secondary cell is deactivated or removed; the secondary cell is reconfigured by the radio resource control; a radio link failure is triggered; a secondary cell group failure that includes the secondary cell is triggered; or a master cell group failure that includes the secondary cell is triggered. In case no uplink shared channel is available for a new transmission, a scheduling request is initiated.

The scheduling request is canceled in case: a transmission of a medium access control protocol data unit including a corresponding one or more the beam failure recovery request medium access control elements triggered prior to an assembling of the medium access control protocol data unit; the failure beam for the secondary cell is recovered; the beam failure recovery procedure is finished; the secondary cell is deactivated or removed; the secondary cell is reconfigured by the radio resource control; a radio link failure is triggered; a secondary cell group failure that includes the secondary cell is triggered; or a master cell group failure that includes the secondary cell is triggered. Once the beam failure recovery request medium access control element is sent to the base station, the scheduling request triggered by this BFRQ MAC CE is canceled.

Once the beam failure recovery request medium access control element is sent to the base station, the user equipment receives, from the base station, an acknowledgement that the base station has received the beam failure recovery request or a notification that the base station has not received the beam failure recovery request. In case an uplink shared channel is available, the user equipment sends, to the base station, the beam failure recovery request medium access control element for acquiring a downlink beam recovery. In case no uplink shared channel is available, the user equipment sends, to the base station, the scheduling request for acquiring an available uplink shared channel for sending the beam failure recovery request medium access control element. The base station is configured to assign a timer or a time window for the user equipment to receive the acknowledgement.

The timer is started or restarted upon occurrence of predetermined events, including: the beam failure recovery is initiated; the beam failure recovery request medium access control element is sent to the base station; and a medium access control protocol data unit with the beam failure recovery request medium access control element is formed for a physical uplink shared channel. The timer is stopped upon occurrence of predetermined events, including: the beam failure recovery is finished; the acknowledgement of reception or the indication of non-reception is received; the secondary cell is recovered; the secondary cell is deactivated or removed; the secondary cell is reconfigured by the radio resource control; a secondary cell group (SCG) failure is triggered where the SCG includes the secondary cell; and a master cell group (MCG) failure is triggered where the MCG includes the secondary cell.

The user equipment is configured to: in case the timer or the time window is expired without receiving the acknowledgement of reception or indication of non-reception, deactivate the secondary cell; and generate a medium access control element for notifying a renewed secondary cell situation. The medium access control element includes at least one of a serving cell identifier or a status indication.

The user equipment is configured to, in case the timer or the time window is expired without receiving the acknowledgement of reception or indication of non-reception, reset a beam failure instance counter that is associated with the beam failure recovery procedure. The user equipment is configured to, in case the timer or the time window is expired without receiving the acknowledgement of reception or indication of non-reception, trigger another beam failure recovery request medium access control element. The user equipment includes a beam failure recovery counter configured to count a number of beam failure recovery attempt iterations.

The user equipment is configured to compose a medium access control element that includes the beam failure recovery request medium access control element, send the medium access control element via an uplink shared channel. The beam failure recovery counter is configured to increase by one every time the user equipment fails to receive an acknowledgement of reception or indication of non-reception until an expiration of the timer or the time window.

The user equipment is configured to reset the beam failure instance counter upon reception of the acknowledgement. The user equipment is configured to reset the beam failure instance counter in case: the secondary cell is recovered; the beam failure recovery procedure is finished successfully; the secondary cell is deactivated or removed; the secondary cell is reconfigured by the radio resource control; a radio link failure is triggered; a secondary cell group failure that includes the secondary cell is triggered; or a master cell group failure that includes the secondary cell is triggered; or the beam failure instance counter reaches to a predetermined maximum count.

The acknowledgement of reception or indication of non-reception indicates at least one of: a beam failure recovery radio network temporary identifier; a physical downlink control channel or downlink control information in a control resource set or in a search space; downlink control information codepoint associated with a link recovery request message; or an indication that a physical uplink shared channel is carrying a medium access control element command.

Figure 7:
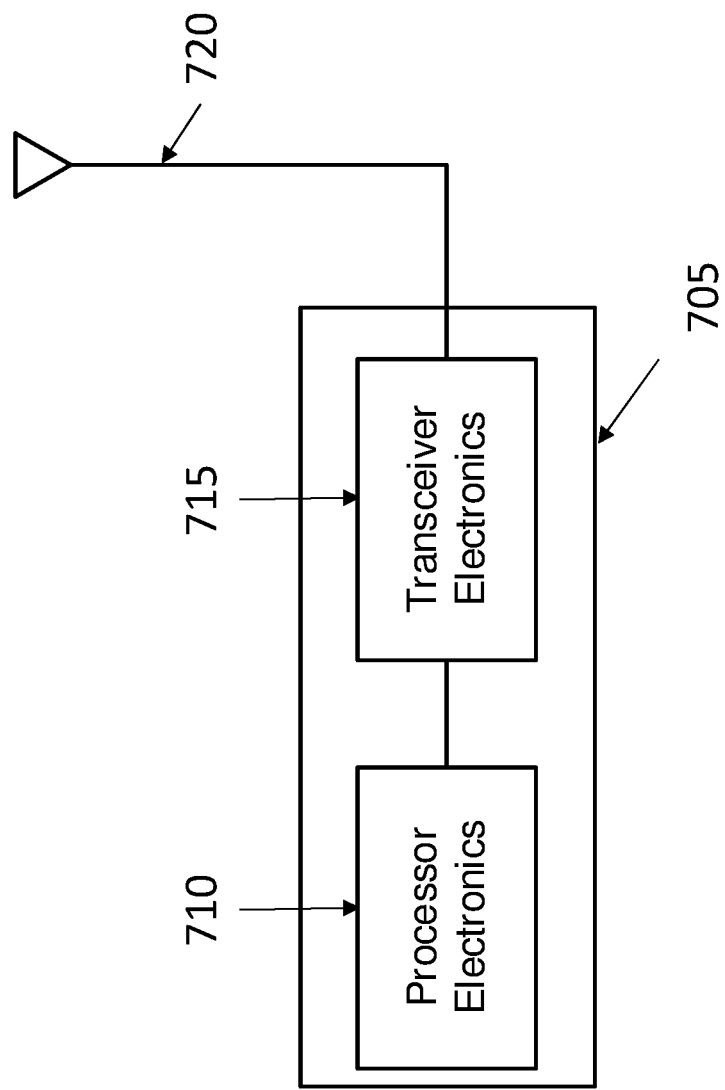
FIG. 7 is a block diagram representation of a portion of a radio station in accordance with one or more embodiments of the present technology can be applied.

FIG. 7 is a block diagram representation of a portion of a radio station. A radio station 705 such as a base station or a wireless device (or UE) can include processor electronics 710 such as a microprocessor that implements one or more of the wireless techniques presented in this document. The radio station 705 can include transceiver electronics 715 to send and/or receive wireless signals over one or more communication interfaces such as antenna 720. The radio station 705 can include other communication interfaces for transmitting and receiving data. Radio station 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the radio station 705.

It will be appreciated that the present document discloses techniques that can be embodied into wireless communication systems to provide bandwidth part specific configurations in order to reduce signaling overhead in a primary cell while supporting fast activation of the secondary cell(s).

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving, by a first device, a maximum number of beam failure recovery request attempt iterations for beam failure recovery for one or more secondary cells associated with the first device;
   triggering, upon a determination that a beam failure event has occurred, a beam failure recovery request medium access control (MAC) control element for a beam failure recovery procedure for at least one secondary cell with the beam failure event,
   wherein the first device includes a beam failure recovery counter configured to count a number of beam failure recovery request attempt iterations until the number of beam failure recovery request attempt iterations reaches the maximum number of beam failure recovery request attempt iterations; and
   triggering, upon a determination that the beam failure recovery procedure is not successful and that the number of beam failure recovery request attempt iterations has not reached the maximum number of beam failure recovery request attempt iterations, another beam failure recovery request MAC control element for the beam failure recovery procedure for the at least one secondary cell with the beam failure event.

2. The method of claim 1, wherein counting the number of beam failure recovery request attempt iterations includes:
   triggering the beam failure recovery request MAC control element so that a beam failure recovery response timer is started; and
   increasing the beam failure recovery counter by one in a case that: the first device fails to receive any notification from a second device until an expiration of a beam failure response timer; or the first device receives a notification indicating that the beam failure recovery is not successful.

3. The method of claim 1, wherein the beam failure recovery procedure includes:
   sending, by the first device, the beam failure recovery request MAC control element to a second device; and
   determining, by the first device, the beam failure recovery procedure is not successful in a case that: the first device fails to receive any notification from the second device until an expiration of a beam failure response timer; or the first device receives a notification indicating that the beam failure recovery is not successful.

4. The method of claim 1, wherein the beam failure recovery counter is reset upon occurrence of one or more predetermined reset events, including:
   the at least one secondary cell with the beam failure event is recovered;

a failure beam on the at least one secondary cell that triggers the beam failure recovery procedure is recovered;

the beam failure recovery procedure is finished successfully;

the at least one secondary cell with the beam failure event is deactivated or removed;

the at least one secondary cell with the beam failure event is reconfigured;

a radio link failure is triggered; and the number of beam failure recovery request attempt iterations reaches the maximum number of beam failure recovery request attempt iterations.

5. The method of claim 1, further comprising terminating the beam failure recovery procedure in a case that the beam failure recovery counter reaches the maximum number of beam failure recovery request attempt iterations.

6. A method for wireless communication, comprising:

triggering, upon a determination that a beam failure event has occurred, by a first device, a beam failure recovery request medium access control (MAC) control element for a beam failure recovery procedure for at least one secondary cell with the beam failure event;

determining, by the first device, the beam failure recovery procedure is not successful in a case that: the first device fails to receive any notification from a second device until an expiration of a beam failure response timer; or the first device receives a notification indicating that the beam failure recovery is not successful; and triggering, upon a determination that the beam failure recovery procedure is not successful, another beam failure recovery request MAC control element for the beam failure recovery procedure for the at least one secondary cell with the beam failure event, wherein the first device includes a beam failure recovery counter configured to count a number of beam failure recovery request attempt iterations.

7. The method of claim 6, wherein counting the number of beam failure recovery request attempt iterations includes:

triggering a beam failure recovery request MAC control element so that a beam failure recovery response timer is started; and increasing the beam failure recovery counter by one in a case that: the first device fails to receive any notification from the second device until an expiration of a beam failure response timer; or the first device receives a notification indicating that the beam failure recovery is not successful.

8. The method of claim 6, wherein the beam failure recovery counter is reset upon occurrence of one or more predetermined reset events, including:

the at least one secondary cell with the beam failure event is recovered;

a failure beam on the at least one secondary cell that triggers the beam failure recovery procedure is recovered;

the beam failure recovery procedure is finished successfully;

the at least one secondary cell with the beam failure event is deactivated or removed;

the at least one secondary cell with the beam failure event is reconfigured;

a radio link failure is triggered; and the number of beam failure recovery request attempt iterations reaches a maximum number of beam failure recovery request attempt iterations.

9. The method of claim 6, further comprising terminating the beam failure recovery procedure in a case that the beam failure recovery counter reaches a maximum number of beam failure recovery request attempt iterations.

10. A first device for wireless communication, comprising a memory and a processor, wherein the processor reads code from the memory and implements a method, comprising:

receiving, by a first device, a maximum number of beam failure recovery request attempt iterations for beam failure recovery for one or more secondary cells associated with the first device;

triggering, upon a determination that a beam failure event has occurred, a beam failure recovery request medium access control (MAC) control element for a beam failure recovery procedure for at least one secondary cell with the beam failure event, wherein the first device includes a beam failure recovery counter configured to count a number of a beam failure recovery request attempt iterations until the number of beam failure recovery request attempt iterations reaches the maximum number of beam failure recovery request attempt iterations; and triggering, upon a determination that the beam failure recovery procedure is not successful and that the number of beam failure recovery request attempt iterations has not reached the maximum number of beam failure recovery request attempt iterations, another beam failure recovery request MAC control element for the beam failure recovery procedure for the at least one secondary cell with the beam failure event.

11. The first device of claim 10, wherein counting the number of beam failure recovery request attempt iterations includes:

triggering the beam failure recovery request MAC control element so that a beam failure recovery response timer is started; and increasing the beam failure recovery counter by one in a case that: the first device fails to receive any notification from a second device until an expiration of a beam failure response timer; or the first device receives a notification indicating that the beam failure recovery is not successful.

12. The first device of claim 10, wherein the beam failure recovery procedure includes:

sending, by the first device, the beam failure recovery request MAC control element to a second device; and determining, by the first device, the beam failure recovery procedure is not successful in a case that: the first device fails to receive any notification from the second device until an expiration of a beam failure response timer; or the first device receives a notification indicating that the beam failure recovery is not successful.

13. The first device of claim 10, wherein the beam failure recovery counter is reset upon occurrence of one or more predetermined reset events, including:

the at least one secondary cell with the beam failure event is recovered;

a failure beam on the at least one secondary cell that triggers the beam failure recovery procedure is recovered;

the beam failure recovery procedure is finished successfully;

the at least one secondary cell with the beam failure event is deactivated or removed;

the at least one secondary cell with the beam failure event is reconfigured;

a radio link failure is triggered; and
the number of beam failure recovery request attempt iterations reaches the maximum number of beam failure recovery request attempt iterations.

14. The first device of claim 10, wherein the method further comprises terminating the beam failure recovery procedure in a case that the beam failure recovery counter reaches the maximum number of beam failure recovery request attempt iterations.

15. A first device for wireless communication, comprising a memory and a processor, wherein the processor reads code from the memory and implements a method, comprising:
triggering, upon a determination that a beam failure event has occurred, a beam failure recovery request medium access control (MAC) control element for a beam failure recovery procedure for at least one secondary cell with the beam failure event;
determining, by the first device, the beam failure recovery procedure is not successful in a case that: the first device fails to receive any notification from a second device until an expiration of a beam failure response timer; or the first device receives a notification indicating that the beam failure recovery is not successful; and
triggering, upon a determination that the beam failure recovery procedure is not successful, another beam failure recovery request MAC control element for the beam failure recovery procedure for the at least one secondary cell with the beam failure event,
wherein the first device includes a beam failure recovery counter configured to count a number of beam failure recovery request attempt iterations.

16. The first device of claim 15, wherein counting the number of beam failure recovery request attempt iterations includes:
triggering a beam failure recovery request MAC control element so that a beam failure recovery response timer is started; and
increasing the beam failure recovery counter by one in a case that: the first device fails to receive any notification from the second device until an expiration of a beam failure response timer; or the first device receives a notification indicating that the beam failure recovery is not successful.

17. The first device of claim 15, wherein the beam failure recovery counter is reset upon occurrence of one or more predetermined reset events, including:
the at least one secondary cell with the beam failure event is recovered;
a failure beam on the at least one secondary cell that triggers the beam failure recovery procedure is recovered;
the beam failure recovery procedure is finished successfully;
the at least one secondary cell with the beam failure event is deactivated or removed;
the at least one secondary cell with the beam failure event is reconfigured;
a radio link failure is triggered; and
the number of beam failure recovery request attempt iterations reaches a maximum number of beam failure recovery request attempt iterations.

18. The first device of claim 15, wherein the method further comprises terminating the beam failure recovery procedure in a case that the beam failure recovery counter reaches a maximum number of beam failure recovery request attempt iterations.

* * * * *